(12) United States Patent
Padi et al.

(10) Patent No.: US 9,244,913 B2
(45) Date of Patent: Jan. 26, 2016

(54) MULTI-LANGUAGE CLOSED CAPTIONING

(75) Inventors: Anil Kumar Padi, Irving, TX (US); Satish Kumar Singh, Irving, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 834 days.

(21) Appl. No.: 12/727,882

(22) Filed: Mar. 19, 2010

(65) Prior Publication Data
US 2011/0231180 A1     Sep. 22, 2011

(51) Int. Cl.
| G06F 17/20 | (2006.01) |
| G06F 17/21 | (2006.01) |
| G06F 17/28 | (2006.01) |
| H04N 21/235 | (2011.01) |
| H04N 21/488 | (2011.01) |
| H04N 21/81 | (2011.01) |

(52) U.S. Cl.
CPC ............ G06F 17/289 (2013.01); H04N 21/235 (2013.01); H04N 21/4884 (2013.01); H04N 21/8133 (2013.01)

(58) Field of Classification Search
CPC ............ G06F 17/289; G06F 17/30849; H04N 21/4884; H04N 7/0885
See application file for complete search history.

(56) References Cited

U.S. PATENT DOCUMENTS

| 7,130,790 | B1 * | 10/2006 | Flanagan et al. ................... 704/2 |
| 7,383,320 | B1 * | 6/2008 | Silberstein .......... G06F 17/3089 707/E17.116 |
| 7,571,455 | B2 * | 8/2009 | Lee ................. 725/109 |
| 8,004,608 | B2 * | 8/2011 | Lee ................. 348/465 |
| 8,250,613 | B2 * | 8/2012 | Faulkner et al. ................. 725/86 |
| 8,621,505 | B2 * | 12/2013 | Petronelli et al. ............... 725/32 |
| 2004/0138871 | A1 * | 7/2004 | Edwards et al. .................... 704/8 |
| 2004/0153310 | A1 * | 8/2004 | Beck ...................... G06Q 30/08 704/10 |
| 2004/0167784 | A1 * | 8/2004 | Travieso et al. ............ 704/270.1 |
| 2005/0162551 | A1 * | 7/2005 | Baker ........................ 348/468 |
| 2005/0267738 | A1 * | 12/2005 | Wilkinson et al. ................. 704/9 |
| 2007/0106516 | A1 * | 5/2007 | Larson et al. .................. 704/270 |
| 2007/0136777 | A1 * | 6/2007 | Hasek et al. ................... 725/114 |
| 2007/0211169 | A1 * | 9/2007 | Sigvaldason .................. 348/468 |
| 2008/0088635 | A1 * | 4/2008 | Callway et al. ................ 345/522 |
| 2008/0279535 | A1 * | 11/2008 | Haque et al. ..................... 386/95 |
| 2009/0175596 | A1 * | 7/2009 | Hirai .............................. 386/97 |
| 2009/0244372 | A1 * | 10/2009 | Petronelli et al. .............. 348/468 |
| 2010/0265397 | A1 * | 10/2010 | Dasher et al. .................. 348/468 |
| 2010/0332214 | A1 * | 12/2010 | Shpalter et al. .................... 704/2 |
| 2011/0231180 | A1 * | 9/2011 | Padi et al. .......................... 704/3 |
| 2012/0128323 | A1 * | 5/2012 | Sigvaldason .................. 386/241 |
| 2012/0204218 | A1 * | 8/2012 | Sigvaldason .................. 725/137 |

FOREIGN PATENT DOCUMENTS

WO     WO 03081917 A1 * 10/2003     ............... H04N 7/24

* cited by examiner

*Primary Examiner* — Richemond Dorvil
*Assistant Examiner* — Michael Ortiz Sanchez

(57) ABSTRACT

A computer server receives, from a remote device, a request for closed caption data, the request specifying media content for which the closed caption data is to be provided. In the server, it is determined whether closed-captioned data for the specified media content is available, and if closed-captioned data for the media content is available, a sequence of records associated with the media content is provided to the device from the server.

19 Claims, 3 Drawing Sheets

MULTI-LANGUAGE CLOSED CAPTIONING

BACKGROUND INFORMATION

Present mechanisms for providing closed caption data may be limited. For example, National Television System Committee (NTSC) and Advanced Television Systems Committee (ATSC) signals generally provide limited data streams for closed-caption data. Therefore, closed caption data may not be available for some media programming of interest to a user, or may not be available in a language of interest to the user.

DETAILED DESCRIPTION OF PREFERRED EMBODIMENTS

Figure 1:
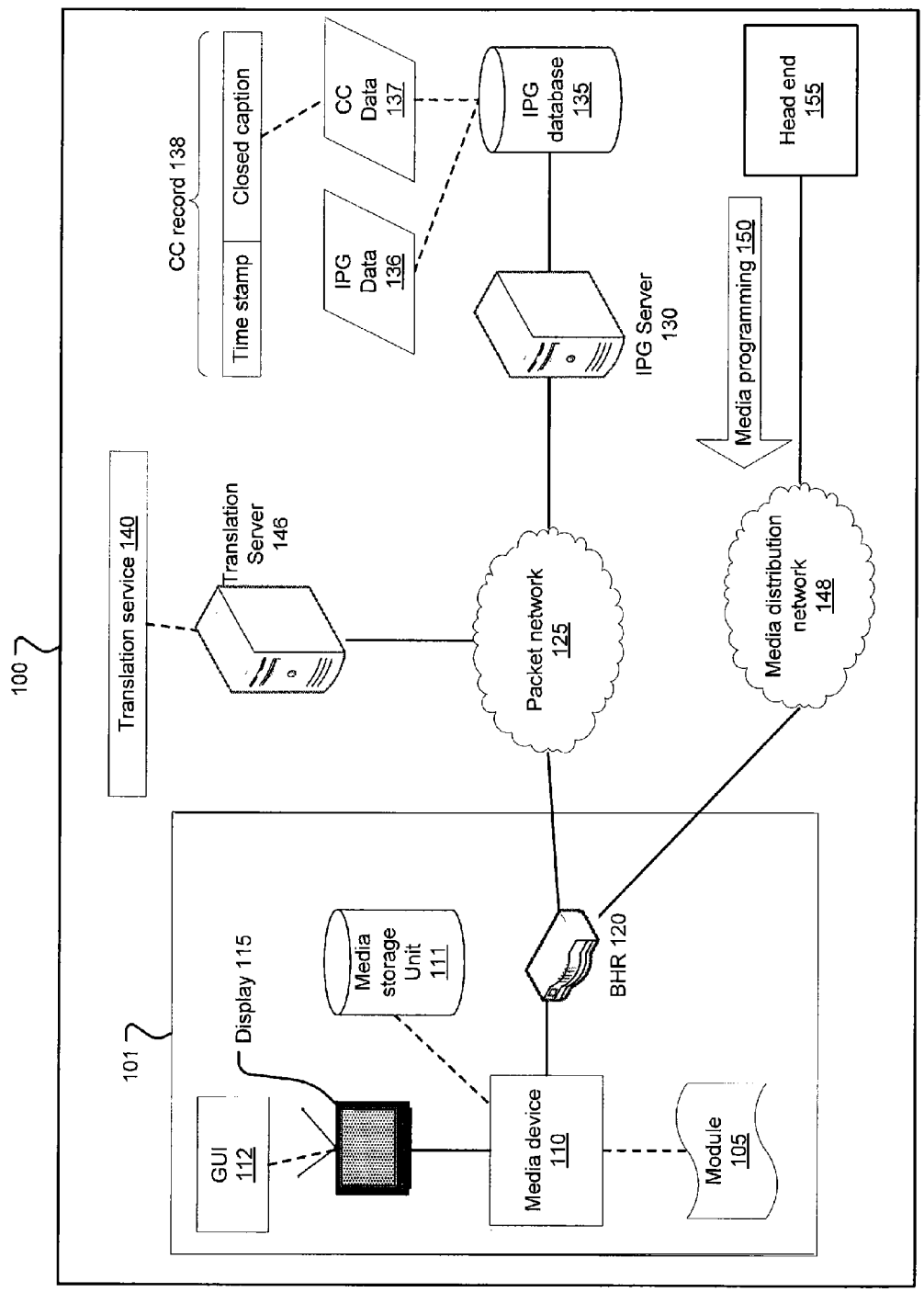
FIG. 1 illustrates an exemplary system for storing and processing media content.

FIG. 1 illustrates an exemplary system 100 for storing and processing media content. A customer premises 101 includes a media device 110, which may be controlled by a user through a control such as a remote control or the like, to view video on a media display device 115. Media display 115 may be a television receiver, including a conventional television or a high definition television (HDTV). A module 105 may be included in a memory or other computer-readable medium associated with media device 110, the module 105 including instructions for allowing a user to select options related to closed captioning.

Media device 110 generally includes a processor and a memory, as well as a computer readable medium, such as a disk or the like, for storing data and computer-executable instructions, e.g., module 105. Media device 110 selectively communicates, via a broadband home router (BHR) 120, with a packet switched network 125 and/or a video distribution network 148.

Media device 110 may be a set top box (STB) or similar device configured for receiving media content from one or more sources. For example, media device 110 may receive media content via packet network 125, e.g., in a known format for digital media such as the Motion Picture Experts Group (MPEG) standard, and/or in the form of a media signal, e.g., a video signal, that includes media programming 150 from media distribution network 148. The device 110 may then be used to provide media content to media display device 115, e.g., through a graphical user interface (GUI) 112. Further, media device 110 is generally communicatively coupled with a media storage unit 111; the storage unit 111 may, but need not, be included within the media device 110. An example of a media device 110 is a set top box (STB), and an example of storage unit 111 is a digital video recorder (DVR).

GUI 112 allows viewers of display 115 to obtain information and to select media content for display on display 115, generally by navigating and making selections using a remote control device or the like. For example, GUI 112 could be used to display lists of content stored in storage unit 111 and/or menus or the like for accessing and managing media data stored in storage unit 111. Often, storage unit 111 may be used to store media data such as media programming 150 received via a media distribution network 148, or media content downloaded via packet network 125. Thus, GUI 112 may be used to display menus, or other mechanisms for providing inputs, to allow a user to provide commands to media device 110 and/or media storage unit 111 for capturing and storing media data, and or for accessing media data via device 110. Further, GUI 112 may be used to display options related to closed captioning, such as a user's preference for having closed captioning turned on or off, a user's preferred languages, size, fonts, and other formatting parameters of closed captioning, etc.

An interactive program guide (IPG) server 130 also selectively communicates with router 120, generally via network 125. IPG server 130 generally includes a processor and a memory, as well as a computer readable medium such as a disk or the like for storing data and computer executable-instructions. An IPG database 135 may be included within IPG server 130, or may be part of a separate computing system. In any event, IPG server 130 is generally configured to selectively retrieve information from IPG database 135 in response to requests for IPG data 136 and/or closed caption (CC) data 137. IPG data 136 includes data concerning channels of media content, e.g., video content available to media device 110. CC data 137 includes data for providing closed captions to video displayed via content processing device 110. For example, data 137 may include records 138, where each record 138 includes two fields. The first field of a record 138 may include a time stamp or other specification of a location in a media stream, e.g., a video stream, with which a closed caption is associated. The second field in a record 138 may include a closed caption that is to be displayed at a time (or location) in a media stream associated with the time stamp (or other specification of a location in a media stream).

Data 136 and 137 may be downloaded to media device 110 via IPG server 130. For example, IPG server 130 provides IPG data 136 to media device 110 to provide an interactive program guide graphical user interface in GUI 112. Accordingly, IPG data 136 may be downloaded to media device 110 and then updated on a regular basis. For example, data 136 may be updated periodically, or as warranted, e.g., when available programming 150 or other media content changes, or new programming 150 or other media content becomes available. Further, IPG data 136 may be used by media device 110 to populate menus or other structures in GUI 112 to allow a user to select programming for viewing via display 115 and/or storage in media storage unit 111. CC data 137 may likewise be stored in database 135 and downloaded to media device 110 on demand, e.g., when a user requests data 137 for display along with a program of media programming 150 or other content delivered through the device 110. A set of data 137 generally includes some mechanism for specifying media content with which the set of data 137 is associated, i.e., media content for which the set of data 137 contains closed captions. For example, a mechanism for specifying media content could be an identifier such as an alphanumeric identifier, a title, or some other substantially unique identifier.

A media distribution network 148 is a network for providing media programming 150, e.g., a video signal. For example, network 148 may include hardware and software for providing a video signal via coaxial cable and/or fiber optic cable. Further, media programming 150 may be provided to the video distribution network 148 as a video signal from a head end 155.

One or more video hub offices (not pictured), sometimes referred to as "VHOs," may serve as a point of aggregation and distribution for media content. For example, a video signal, e.g., a video signal encoded as a Motion Picture Experts Group-2 (MPEG 2) stream, may be provided from a head end 155 through a media distribution network 148 to a video hub office. Accordingly, IPG server 130 may be located in a VHO. Further, IPG server 130 or some other server in the VHO may receive media programming 150 from the media distribution network 148, e.g., one or more video signals, and may combine such media data 150 with IPG data 136 for delivery to media device 110.

Packet switched network 125 is generally an internet protocol (IP) network. As such, network 125 uses protocols for transporting data, such as user datagram protocol (UDP), transport control protocol (TCP), hypertext transfer protocol (HTTP), etc. Further, network 125 may include a variety of networks such as a wide area network (WAN), e.g., the Internet, a local area network (LAN), etc. Packet switched network 125 may be used to transport a variety of data, including multimedia data such as audio and video. Accordingly, it is to be understood that networks 125 and 148 may in fact be combined into a single network, or that video distribution network 148 may simply be omitted, whereby packet switched network 125 is used to provide programming 150 and/or other media content to media device 110, possibly through a video hub office as discussed above.

BHR 120 distributes audio, video, and data to devices within customer premises 101, such as media device 110. For example, BHR 120 may be a broadband home router or wireless broadband home router from Actiontec Electronics, Inc. of Sunnyvale, Calif.

A translation server 146 generally includes a processor and a memory, as well as a computer readable medium such as a disk or the like for storing data and computer executable-instructions, e.g., translation service 140. The translation service 140 generally includes instructions for receiving a document or string of text in a first language, and translating some or the entire document or string of text to a second language. In some cases, operations of translation server 146 and a translation service 140 may be provided by a service available via the Internet, e.g., the translation service found at translate.google.com at the time of filing this application, and provided by Google Inc. of Mountain View, Calif.

Computing devices such as media device 110, IPG server 130, etc. may employ any of a number of computer operating systems, including, but by no means limited to, versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Computing devices may include any one of a number of computing devices, including, without limitation, a computer workstation, a desktop, notebook, laptop, or handheld computer, or some other computing device.

Media device 110 generally is a specialized device for receiving media content, e.g., video signals, from head end 155 via network 148, e.g., via a VHO, and may be provided with a proprietary or specialized operating system other than those enumerated above. For example, media device 110 may be an STB provided with a real time operating system (RTOS) or the like. Further, media storage unit 111 may be a digital video recorder (DVR) or the like. However, it is to be understood that media device 110 and/or media storage unit 111 may be one or more computing devices such as one of those enumerated above, so long as the computing device or devices are capable of storing and managing media data, e.g., recording media data according to user-programmed instructions, playing back media content in response to a user request, etc., and in general storing and executing the instructions included in module 105.

Computing devices such as media device 110, IPG server 130, etc., generally each include instructions executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Databases or data stores described herein may include various kinds of mechanisms for storing, accessing, and retrieving various kinds of data, including a hierarchical database, a set of files in a file system, an application database in a proprietary format, a relational database management system (RDBMS), etc. Each such database or data store is generally included within a computing device employing a computer operating system such as one of those mentioned above, and are accessed via a network in any one or more of a variety of manners. A file system may be accessible from a computer operating system, and may include files stored in various formats. An RDBMS generally employs Structured Query Language (SQL) in addition to a language for creating, storing, editing, and executing stored procedures, such as the PL/SQL language mentioned above.

Figure 2:
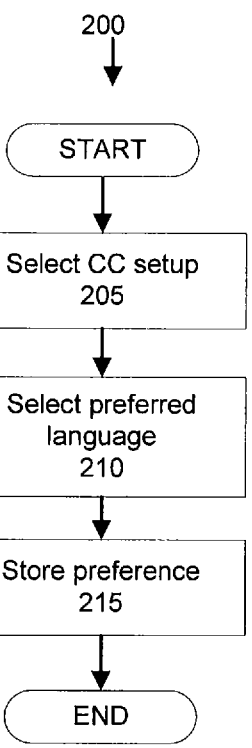
FIG. 2 illustrates an exemplary process for configuring media device for closed captioning.

FIG. 2 illustrates an exemplary process 200 for configuring media device 110 for closed captioning. The process 200 begins in a step 205, in which a user uses a remote control or other mechanism to select an option to configure closed captioning. For example, a remote control may include a dedicated button for selecting configuration of closed captioning on media device 110, one or more menus or other selection mechanisms may be provided within GUI 112, etc.

Next, in step 210, a user is provided with an option to select a preferred language, or possibly even a plurality of preferred languages, generally specified in an order of preference, for closed captioning. A user may also be provided with other options, such as an option to have closed captioning provided automatically with media content for which it is available, or an option to have closed captioning provided in a preferred language when a user individually selects for closed captioning to be provided with a particular program of media programming 150 or other media content. If no preferred language, or if step 210 is omitted, it is possible that a last language selected could be stored as a user's preferred language.

Next, in step 215, media device 110 stores preferences indicated in step 210. For example, such preferences may be stored in a memory or other data store associated with media device 110 or media storage unit 111. Alternatively or additionally, preferences may be associated with a user and/or media device 110, and stored in database 135, or some other database accessible via network 125.

Following step 215, process 200 ends.

Figure 3:
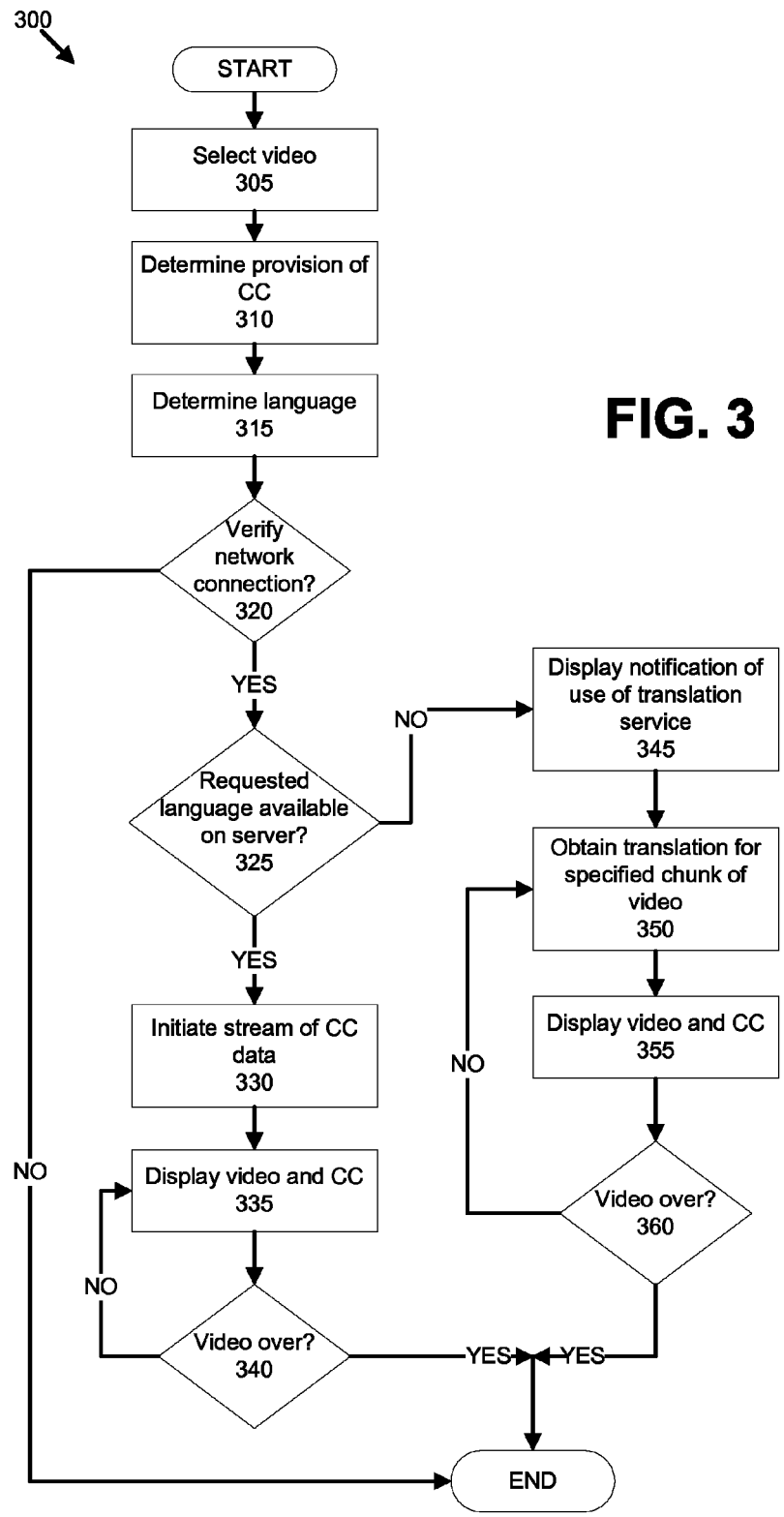
FIG. 3 illustrates an exemplary process for providing closed captioning via media device for a program of media content or some other media content.

FIG. 3 illustrates an exemplary process 300 for providing closed captioning via media device 110 for a program of media programming 150 or some other media content, e.g., content received via packet network 125. Process 300 begins in a step 305, in which a user selection of a media program, e.g., a video, is received in media device 110. Such selection may be received in a variety of ways. For example, a user may select a particular channel of media programming 150 for viewing, or a user may request programming 150, or some other content, such as content received via packet network 125, on demand.

Next, in step 310, media device 110 determines that closed captioning should be provided for the media content requested in step 305. Media device 110 may determine that closed captioning should be provided for media content according to a user request when in the media content is selected, or according to preferences stored as described above with respect to process 200. For example, every time a user of device 110 requests a particular channel of media programming 150, requests a particular type of media programming 150, e.g., a movie, or according to some other criteria, closed captioning may be provided.

Next, in step 315, media device 110 determines in what language closed captioning it should be provided, e.g., according to preferences stored as described above, according to an input received from a user along with or subsequent to selection of the media content for which closed captioning is to be provided, according a last language selected as stored in device 110, etc.

Next, in step 320, media device 110 determines whether a connection is established to IPG server 130 through network 125. If a connection to network 125 is not available, process 300 ends, generally after displaying an error message or the like to the user via a GUI 112 indicating that closed captioning cannot be provided because a network connection is not available. However, if a connection to network 125 is available, step 325 is executed next.

In step 325, media device 110 transmits a request for closed captioning for the media content selected in step 305 to IPG server 130, which then determines whether closed captioning is available for the media content in the requested language. As mentioned above, closed caption data 137 is generally associated with a program of media content according to some identifier that specifies the media content. Metadata for closed caption data 137 generally further specifies the language in which the closed caption data 137 is provided. Thus, upon receiving a request for closed captioning data in a particular language for a particular set of media content, server 130 can query database 135 to determine if closed caption data 137 is available for the specified media content in the specified language. If so, step 330 is executed next. Otherwise, step 345 is executed next.

In step 330, server 130 initiates provision of closed caption data 137 to media device 110. Provision of closed caption data 137 generally require some synchronization with the media content with which the closed caption data 137 is being provided. For example, IPG server 130 may include information relating to a start time of media programming 150, or for other media content media device 110 may provide an indication to IPG server 130 when the provision of such content through media device 110 has begun. In any event, provision of closed caption data 137 generally includes providing closed caption records 138 in a sequence to media device 110. That is, each record 138 of data 137 may include a line or set of closed-captioning that is displayed together at one time along with (e.g., overlaid on) media content. Note that a record 138 generally includes a time stamp or other location indicator along with a closed caption, and therefore generally only a part of a record 138 (the closed caption, and not the time stamp or other location indicator) is generally provided by device 110 to display 115.

In step 335, which follows step 330, media device 110 provides media content, e.g., video, and closed caption data 137 to display 115. Generally, media device 110 parses each closed caption record 138 as it is received to determine the timestamp or location in media content at which the closed caption in the closed caption record 138 should be displayed. Further, the closed caption data 137 may be displayed as close captioning is conventionally displayed, e.g., overlaid on a video display.

Next, in step 340, e.g., after displaying each record 138 of closed caption data 137, media device 110 determines whether the media content being played has ended. Alternatively, media device 110 could encounter an end of file marker or the like in closed caption data 137 and/or a file or stream of media content. In any event, if the media content has ended, then process 300 ends. Otherwise, process 300 returns to step 335.

Step 345 may follow step 325 as described above when it is determined that the language for closed captioning requested by a user is not available via IPG server 130. In step 345, media device 110 displays a message in GUI 112 notifying a user that translation service 140 will be used to provide closed captioning. Although not shown in FIG. 3, in some cases a user may be provided the opportunity to opt out of use of translation service 140, and thereby end process 300.

Following step 345, in step 350, media device 110 obtains from translation service 140 a translation for a specified portion of media content being displayed to a user. Media device 110 may request such translation according to a variety of mechanisms. For example, media device 110 may obtain closed caption data 137 from server 130 in a language for which is available, and then transmit a request to translation service 140, e.g., according to hypertext transfer protocol (HTTP), to translate from the available language to the language requested by a user. For example, closed caption data 137 for particular media content may be available in English, but not French. Thus, media device 110 could obtain the closed caption data 137 in English, and submit records 138 of closed caption data, or at least the closed caption portion of such records 138, to translation service 140, for rendering in French. Alternatively, speech recognition technologies such as is known may be employed to capture portions of media content requiring translation, which may then be submitted to translation service 140. Further alternatively, closed caption data 137 included in programming 150 could be extracted from the programming 150 at head end 155, sent to translation service 140, and then the results of the translation re-inserted in the programming 150 for delivery to device 110.

Following step 350, in step 355, media device 110 causes media content and a closed caption to be displayed on display 115. For example, if closed caption data 137 has been translated by translation service 140, media device 110 may cause a closed caption from a record 138 to be displayed according to the timestamp or other location indication in the record 138, after the closed caption has been appropriately translated by translation service 140 as described above.

Next, in step 360, media device 110 determines whether media content being displayed has ended, e.g., as described above with respect to step 340. If so, process 200 ends. Otherwise, process 200 returns to step 350.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method, comprising:
   receiving, in a computer server, from a remote device, a request for closed-captioned data, the request for closed-captioned data specifying media content for which the closed-captioned data is to be provided;
   querying a database, in which closed-captioned data is stored and with which the computer server is in communication, to determine whether closed-captioned data for the specified media content is available;
   if closed-captioned data for the specified media content is available, determining, in the remote device that the closed-captioned data is not available in a language specified in the remote device by determining that records associated with the media content are not in a language specified in the remote device;
   in response to determining that the closed-captioned data is not in a language specified in the remote device, providing a message that a translation service will be used to provide the closed captioning in the specified language;
   providing an option to opt out of use of the translation service;
   if the option to opt out of use of the translation service is not selected, transmitting, from the remote device via a network to the translation service, a request to translate at least one of the records to a language specified in the remote device; and
   providing, to the remote device, from the server, a sequence of the records associated with the media content;
   wherein the language specified in the remote device is based on the type of specified media content.

2. The method of claim 1, further comprising:
   providing to a display, from the remote device, the media content along with at least part of the at least one of the records according to an indication in the at least one of the records of a location in the media content with which the at least one of the records is associated.

3. The method of claim 1, further comprising:
   receiving, from the translation service in the remote device, a response to the request to translate that includes a translation of at least part of the at least one of the records; and
   providing to a display, from the remote device, the media content along with the translation according to an indication in the at least one of the records of a location in the media content with which the at least one of the records is associated.

4. The method of claim 1, wherein the records associated with the media content includes at least one time stamp indicative of a sequence of the media content.

5. The method of claim 1, further comprising providing an error message to the remote device in response to closed-captioned data for the media content being unavailable.

6. A method, comprising:
   providing, from the media processing device, to a remote server, a request for closed caption data, the request for closed caption data including a specification of media content and a specification of a language for the closed caption data;
   receiving, by the media processing device from the remote server, an indication that the requested closed caption data is not available in the specified language;
   displaying, on a display in communication with the media processing device, a message that the translation service will be used to provide the closed captioning in the specified language;
   providing an option to opt out of use of the translation service; and
   if the option to opt out of use of the translation service is not selected, transmitting, from the media processing device via a network to the translation service, a request to translate at least one record associated with the media content received from the remote server to the specified language;
   wherein the specified language is based on the type of specified media content.

7. The method of claim 6, further comprising:
   receiving, from the translation service in the media processing device, a response to the request to translate that includes a translation of at least part of the at least one record; and
   providing to a display, from the media processing device, the media content along with the translation according to an indication in the at least one record of a location in the media content with which the at least one record is associated.

8. The method of claim 6, further comprising:
   storing the specification of the language in the media processing device according to user input; and retrieving the specification of the language for inclusion in the request for closed caption data.

9. The method of claim 6, further comprising determining whether closed caption data should be requested based on at least one of a channel with which the media content is associated and a type of media programming in which the media content is categorized.

10. The method of claim 6, further comprising:
receiving, by the media processing device, a selection of a plurality of preferred languages specified in an order of preference; and
storing, in the media processing device, the plurality of preferred languages,
wherein the specification of language is selected from the plurality of preferred languages stored in the media processing device.

11. A system, comprising a computer server configured to:
receive, from a remote device, a request for closed-captioned data, the request for closed-captioned data specifying media content for which the closed-captioned data is to be provided;
query a database in which closed-captioned is stored to determine whether closed-captioned data for the specified media content is available;
if closed-captioned data for the specified media content is available, determine that the closed-captioned data is not available in a language specified in the remote device by determining that records associated with the media content are not in a language specific to the remote device;
in response to determining that the closed-captioned data is not in a language specified in the remote device, providing a message that a translation service will be used to provide the closed captioning in the specified language;
providing an option to opt out of use of the translation service;
if the option to opt out of use of the translation service is not selected, receive a request to translate at least one of the records to the language specified in the remote device; and
provide, to the remote device, a sequence of records associated with the media content;
wherein the language specified in the remote device is based on the type of specified media content.

12. The system of claim 11, further comprising the remote device configured to provide to a display the media content along with at least part of at least one of the records according to an indication in the at least one of the records of a location in the media content with which the at least one of the records is associated.

13. The system of claim 11, the remote device further configured to:
receive, from a translation service, a response to the request to translate that includes a translation of at least part of the at least one of the records; and
provide, to a display, the media content along with the translation according to an indication in the at least one of the records of a location in the media content with which the at least one of the records is associated.

14. The system of claim 11, the server further configured to provide the media content via a packet network to the remote device.

15. The system of claim 11, wherein the computer server is further configured to retrieve interactive program guide data associated with the media content from the database.

16. A system, comprising a media processing device configured to:
receive a selection of a plurality of preferred languages specified in an order of preference;
store the plurality of preferred languages;
provide, to a remote server, a request for closed caption data, the request for closed caption data including a specification of media content and a specification of a language for the closed caption data;
receive, from the remote server, an indication that the requested closed caption data is not available in the specified language; and
displaying, on a display in communication with the media processing device, a message that the translation service will be used to provide the closed captioning in the specified language;
providing an option to opt out of use of the translation service; and
if the option to opt out of use of the translation service is not selected, transmitting, from the media processing device via a network to the translation service, a request to translate at least one record associated with the media content received from the remote server to the specified language;
wherein the specification of language is based on the type of specified media content and is
selected from the plurality of preferred languages.

17. The system of claim 16, the media processing device further configured to:
receive, from the translation service, a response to the request to translate that includes a translation of at least part of the at least one record; and
provide, to a display, the media content along with the translation according to an indication in the at least one record of a location in the media content with which the at least one record is associated.

18. The system of claim 16, the media processing device further configured to:
store the specification of the language according to user input; and
retrieve the specification of the language for inclusion in the request for closed caption data.

19. The system of claim 16, the media processing device further configured to receive user input of the specification of the language; and base the specification of the language on the user input.

* * * * *